Figure 2:
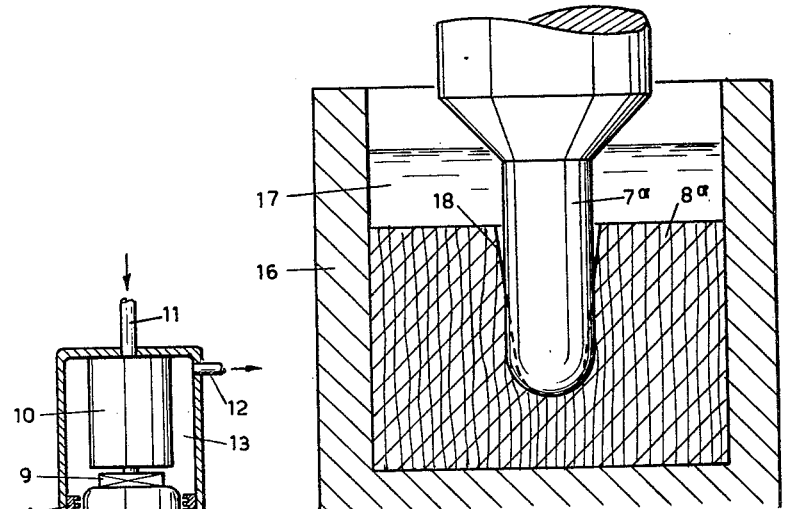

Sept. 4, 1962 J. WIND 3,052,504
POINT BEARINGS FOR THE SUPPORT OF A
ROTOR ROTATING WITH HIGH SPEED
Filed March 14, 1961

United States Patent Office 3,052,504
Patented Sept. 4, 1962

3,052,504
POINT BEARINGS FOR THE SUPPORT OF A
ROTOR ROTATING WITH HIGH SPEED
Jaap Wind, Bussum, Netherlands, assignor to Reactor Centrum Nederland, The Hague, Netherlands, an institute of the Netherlands
Filed Mar. 14, 1961, Ser. No. 95,742
Claims priority, application Netherlands Mar. 17, 1960
8 Claims. (Cl. 308—159)

The invention relates to a point bearing for the support of a rotor rotating with high speed, e.g. the rotor of an ultracentrifuge, said rotor being provided with a pintle made of wear resisting material and resting on the bottom of a socket made of elastic material, such as guajak-wood, that is, the wood of the Guaiacum Arboretum of which the fibres are parallel to the pintle.

Point bearings are known, in which the pintle rests in a socket of hard stone or in which it is supported by a wooden socket. In these point bearings the pintle contacts the socket only with its rounded-off lower end. It has appeared, that such point bearings are not suitable for rotors rotating with high speed, since the pintle is apt to jump out of the socket due to gyroscopic moments when rotating with a speed above a certain number of revolutions.

The invention has for its object to provide in a simple way a point bearing for high-speed rotors, in which the danger referred to does not occur. It consists in that the socket grasps the pintle on a part of its length while exerting an elastic grip thereon. If the socket consists of wood, it is capable to exert a certain clamping force on the pintle without the danger of unallowable friction and wear in the point bearing. It appears that also after some wear the grip exerted by the socket on the pintle remains sufficient to keep the pintle in the socket. Thereby the jumping of the rotor is prevented. The pintle is well kept in the socket, when it is formed as a drop or ends in a globe of greater diameter.

In order to obtain the effect aimed at with certainty it is recommended to make the depth of the recess of the socket at least equal to the maximum diameter of the part of the pintle engaging the socket. Good results are obtained when said depth is made one time to one and a half times said diameter.

In order to obtain the desired elastic grip between the socket and the pintle it is advantageous to give the recess of the socket originally the shape of a cone having a spherically rounded-off top, the conicity of said recess being such as to have an apex angle of the cone of 5–10° being at the most 5% smaller than the radius of the spherically rounded-off end portion of the pintle. Even after a long-continued operation the wear of the socket appears to be so much less than 5% that sufficient grip between the socket and the pintle remains to keep the pintle in the socket.

Figure 1:
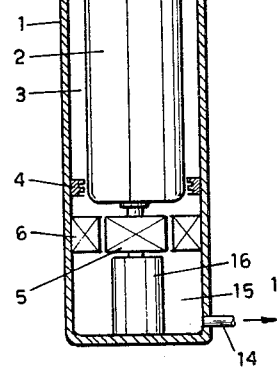
Figure 3:
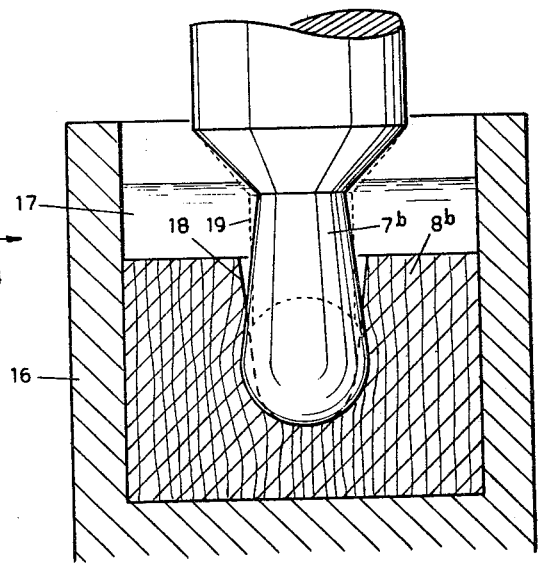

For the elucidation reference is made to the accompanying drawing. Therein is:

FIG. 1 partly a sectional view and partly an elevational view of an ultracentrifuge, FIG. 2 at a larger scale a sectional view of the point bearing for the rotor of said centrifuge, and FIG. 3 also at a larger scale a sectional view of a point bearing of slightly different shape for said rotor.

In the drawing a stationary closed housing is designated by 1. A centrifuge rotor 2 is mounted for rotation in said housing. In the space 3 between the rotor 2 and the housing a high vacuum is maintained. Screw-seals operating according to the principle of Holweck's molecular pump are designated by 4. The rotor is driven by an electromotor 5, 6 and rests with a pintle 7 in a socket 8 (FIGS. 2, 3). Attached to the upper end of the rotor is a permanent magnet 9 which is attracted by a body of magnetic material (not shown) provided in a container 10. Such magnet keeps the rotor 2 in its vertical position. The mixture to be separated is supplied to the rotor 2 through the stationary conduit 11 and the components of said mixture to be separated are discharged at 12 from the chamber 13 and at 14 from the chamber 15, respectively.

The socket 8 is made of elastic material, e.g. guajakwood and the rotor pintle 7 consists of hard wear-resisting material, e.g. some sore of hard steel. The point bearing 7, 8 is situated in a container 16 containing oil 17 for the lubrication and the cooling of said bearing.

In FIG. 2 the pintle has the shape of a cylinder, the lower end of which is rounded-off, and the recess 18 of the socket 8a has originally the shape of a cone having a rounded-off top, the apex angle of said cone being 5–10° and the radius of said rounded-off top being at least 5% smaller than the radius of the pintle. The fibres of the wood of the socket 8a are parallel to the pintle 7a. Consequently, the lower part of the pintle 7a compresses the wood a little in radial direction in such manner, that between the socket 8a and the pintle 7a an elastic clamping force is produced which appears under all circumstances to be sufficient to keep the pintle in the socket.

In FIG. 3 the pintle 7b has the shape of a drop. Also in this case the socket 8b is made of wood and it has an originally cone-shaped recess 18, the bottom of which is rounded-off. The wood exerts an elastic grip on the lower portion of the pintle 7b, said grip having a downward component so that the pintle 7b is kept in said recess more effectively. The cone-shape of the recess 18 permits precession-movements of the rotor.

In the illustrated embodiments of the point bearing the depth of the recess is greater than the maximum diameter of the pintle. In order to obtain good results said depth is chosen 1–1.5 times said diameter.

Instead of a drop-shaped pintle 7b a cylindric pintle may be used, which ends in a globe of greater diameter, see for instance the dotted lines in FIG. 3.

What I claim is:

1. A point bearing for the support of a rotor rotating with high speed, comprising a pintle of wear-resisting material, a socket of elastic material and a recess made in said socket, said pintle resting on the bottom of said recess and said socket grasping the pintle on a part of its length while exerting an elastic grip thereon.

2. A point bearing as claimed in claim 1, in which the pintle has the shape of a drop.

3. A point bearing as claimed in claim 1, in which the pintle ends in a globe of greater diameter.

4. A point bearing as claimed in claim 1, in which the depth of the recess of the socket is at least equal to the maximum diameter of the part of the pintle engaging the socket.

5. A point bearing as claimed in claim 1, in which the depth of the recess of the socket is at least equal to and at the most one and a half times the maximum diameter of the part of the pintle engaging the socket.

6. A point bearing as claimed in claim 1, in which the recess of the socket originally has the shape of a cone having a spherically rounded-off top.

7. A point bearing as claimed in claim 1, in which the recess of the socket originally has the shape of a cone having a spherically rounded-off top, the apex angle of said cone being at least 5° and at the most 10°.

8. A point bearing as claimed in claim 1, in which the recess of the socket originally has the shape of a cone having a spherically rounded-off top, the radius of said rounded-off top originally being at the most 5% smaller than the radius of the spherically rounded-off end portion of the pintle.

References Cited in the file of this patent

UNITED STATES PATENTS

| | | |
|---|---|---|
| 1,870,036 | Bruce et al. | Aug. 2, 1932 |
| 2,766,080 | Fineran | Oct. 9, 1956 |
| 2,968,055 | Linderath | Jan. 17, 1961 |
| 2,987,638 | Lux | June 6, 1961 |